D. D. MOFFAT.
ORE CONCENTRATION.
APPLICATION FILED FEB. 2, 1918.
1,415,105.
Patented May 9, 1922.
2 SHEETS—SHEET 1.
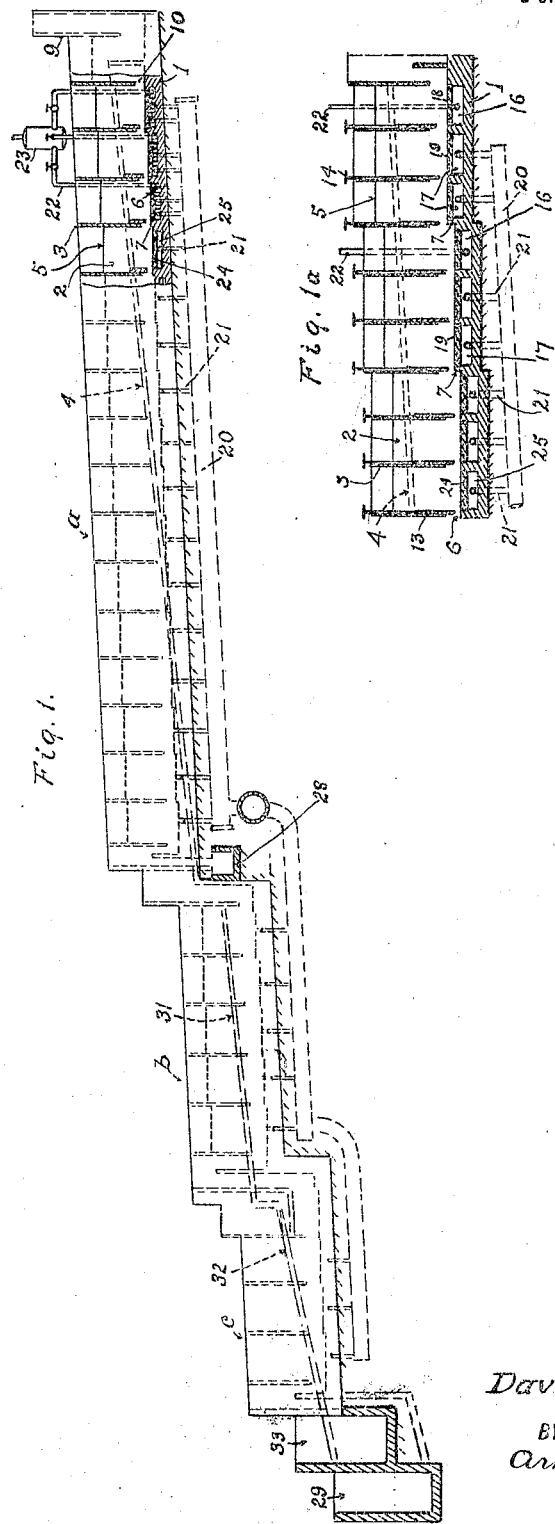
INVENTOR
David D. Moffat
BY
Arthur P. Knight
ATTORNEY

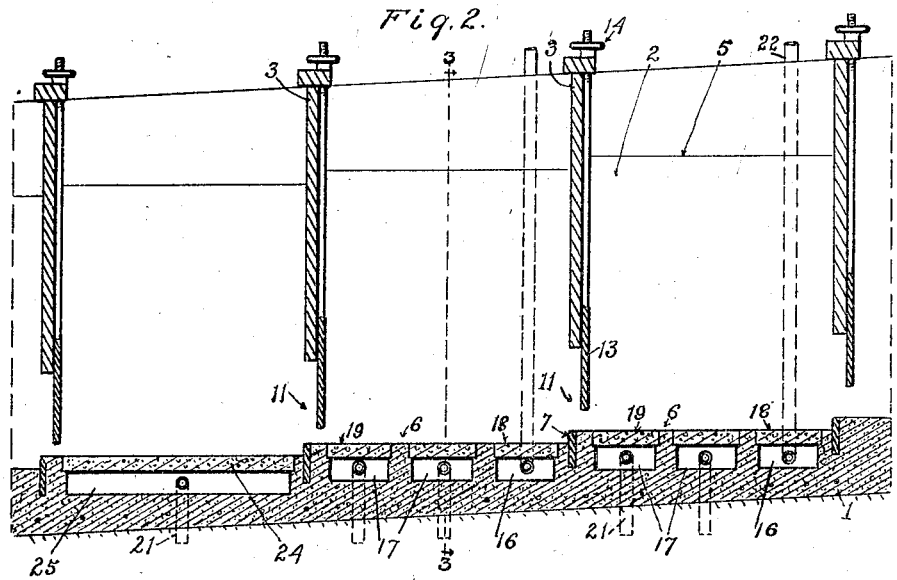
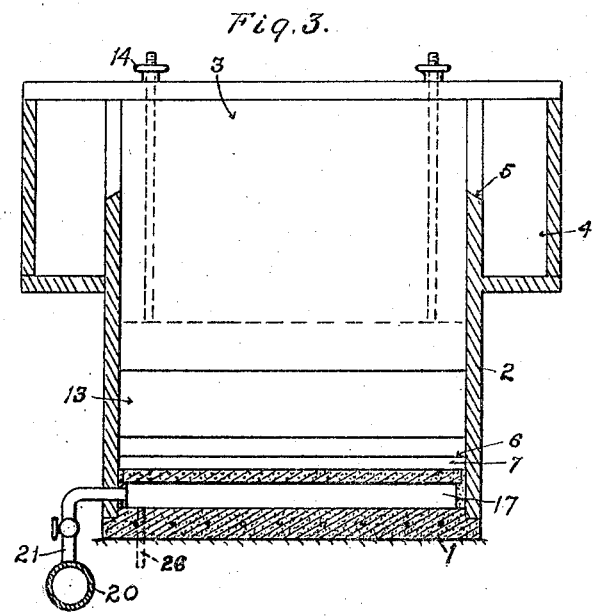

UNITED STATES PATENT OFFICE.

DAVID D. MOFFAT, OF HAYDEN, ARIZONA.

ORE CONCENTRATION.

1,415,105.  Specification of Letters Patent.  Patented May 9, 1922.

Application filed February 2, 1918. Serial No. 215,019.

*To all whom it may concern:*

Be it known that I, DAVID D. MOFFAT, a citizen of the United States, residing at Hayden, in the county of Gila, State of Arizona, have invented a new and useful Improvement in Ore Concentration, of which the following is a specification.

This invention relates to the concentration of ore by the flotation process, and particularly in connection with that type of apparatus wherein a free flowing body of ore pulp is subjected to aerating action in presence of a flotation agent, and the main object of the present invention is to provide for producing more uniform and effective aerating action throughout the body of ore pulp than is the case with apparatus heretofore in use.

The accompanying drawing illustrates an embodiment of my invention and referring thereto:

Fig. 1 is a side elevation of the concentrating apparatus partly broken away.

Fig. 1ª is a partial longitudinal section of a modified form of my invention.

Fig. 2 is a longitudinal section of a portion of the apparatus shown in Fig. 1.

Fig. 3 is a section on line 3—3 in Fig. 2.

The embodiment of my invention shown in Figs. 1, 2 and 3 of the drawings comprises a trough provided with a floor 1, side walls 2, and transverse partitions 3, said partitions dividing said trough into a series of flotation cells or sections. At one or both sides of the trough a concentrates launder 4 is provided into which the concentrates overflow from a horizontal lip 5 at the top of side wall 2. The upper surface of floor 1 is formed in a series of steps or horizontal floor sections 6, in such manner that the floor section at the bottom of each flotation cell is at uniform level throughout and is raised above the level of the floor section of the next succeeding cell by reason of a drop or shoulder formed in the floor as indicated at 7, between the successive cells. The overflow lip at either or both sides of the cell is horizontal, and the floor being also horizontal a uniform hydrostatic head is presented throughout each cell. Suitable means, indicated at 9, in Fig. 1, are provided for supplying ore pulp to the series of cells, said ore pulp passing through an opening 10 at the upper end of the trough into the first cell and passing from cell to cell through openings 11 at the lower portion of the partitions 3, the size of said openings being regulated by baffle plates 13 adjusted by suitable means 14. Any desired number of cells may be arranged in series and as shown in Fig. 1, the arrangement may be such as to provide a series of rougher cells indicated at *a*, followed by a series of cleaner cells indicated at *b*, taking the concentrates from launder 4, and a third series of cells indicated at *c*, for treating tailings from the cleaner cells; or, if desired, any other arrangement of the cells may be used according to the requirements of the ore. The tailings from the rougher cells may flow to launder 28, and the tailings from cell *c* may flow to launder 29. The concentrates from cells *b* and *c* flow by launders 31 and 32 to a launder 33.

In the bottom of each flotation cell is provided means for supplying an aerating agent. For this purpose, chambers or passages 16 and 17 may be provided in the floor 1 and porous mats 18 and 19 may be provided over the respective chambers 16 and 17, said mats forming part of the floor of the flotation cells. An aerating agent, such as compressed air, is supplied to the respective chambers 17; for example, from a compressed air main 20, from which valved pipes 21 lead to the respective chambers 17. A plurality of air supply chambers and mats may be provided in each flotation cell, or in any desired number of such cells, and I prefer to utilize one or more of such mats in one or more of the first cells of the series for supplying a suitable flotation agent, together with the air or aerating agent to the pulp. For this purpose, a supply pipe 22 may lead to each of the chambers 16, which may, for example, be the initial chambers in several of the first flotation cells of a series of rougher cells *a*, said pipes 22 communicating with a receiver 23 to which a mixture of compressed air and vapor of flotation agent is supplied in any suitable manner. The method of supplying the mixture of compressed air and vapor of a flotation agent is not a part of the invention herein claimed but is described and claimed in my copending application, Ser. No. 201,043, filed Nov. 9, 1917, and granted December 13, 1921, as Patent No. 1,400,308. Drain pipes may be provided for any or all of the chambers, such as indicated at 26 in Fig. 3 for chamber 17.

If desired, some of the flotation cells may be provided with means for supplying aerating air alone thereto; for example as shown in Fig. 1, all of the cells of the rougher series $a$ after the first few cells and all of the cells of the series $b$ and $c$ are shown as provided with means for supplying aerating air alone, said means comprising a porous mat 24 in the bottom of each cell and a chamber or passage 25 below said mat and communicating by valved pipe 21 with the compressed air main 20. It will be understood however that in case of these cells wherein air or gas alone is supplied without flotation agent, the aerating mat may be made in any desired number of sections in each cell, said sections being supplied by a common chamber, by intercommunicating chambers, or by chambers supplied with air separately, so as to provide for independent pressure regulation. In this connection, it may be stated that the provision of the flat, level bottom in each cell giving a uniform hydrostatic head throughout the cell, reduces to a minimum the necessity of independent regulation at different parts of the cell, but it may in some cases be desirable to provide for independent regulation, on account, for example, of slight differences in the texture of the mats.

In the operation of my invention the free flowing pulp of comminuted ore and water is supplied to the upper end of the trough and flows successively through all of the flotation cells of each series and is subjected to aeration in the several cells by air or other gas forced through the mats in the bottom of the cells. A suitable flotation agent, such as oil or tar, etc., is supplied to the pulp, such flotation agent being preferably applied in connection with a portion of the aerating medium; for example, through pipes 22 to initial chamber 16 in the first few cells. In some cases however, the flotation agent may be applied to the ore pulp and mixed therewith in any well known manner before it enters the aerating flotation cells. In any case the effect of the aeration as above described is to produce a column of bubbles, the latter overflowing over the horizontal lips 5 at one or both sides of the trough and running off in the concentrates launders. The substantially horizontal arrangement of the floor surface of each cell provides substantially uniform hydrostatic head throughout the entire body of pulp within each cell, thereby providing for uniform flotative action as far as possible throughout each cell and the stepped relation of the cells or the drop between successive cells provides for the flow from each cell to the next, required for continuous operation, this drop being sufficient to produce such velocity of flow at the bottom of the cells as will cause the coarser material or sand to be carried along and prevent the same lodging on the cell floor. At the same time the main body of ore pulp in the upper parts of the cells is substantially quiescent as regards stream flow and is therefore in most favorable condition for building up of the bubble columns.

As shown in Fig. 1ᵃ, there may be several flotation cells, separated by partitions 3, for each step 6 of the floor 1 of the apparatus, the depth of the ore pulp between each floor section and the overflow lips 5 being uniform throughout each step. In other respects the construction and operation may be as above described. In this case, each of the cell sections between successive partitions 3, may be provided with a single aeration means, comprising chamber 16, 17 or 25, and mat 18, 19 or 24, said chambers 25 and 17 being supplied with air alone, from pipe 20, and chambers 16 being supplied with air mixed with vapor of flotation agent, through pipes 22.

In either of the embodiments of my invention above described, the pressure of the aerating medium supplied from the pipe 20 may be made uniform throughout each cell and throughout the entire series of cells or any part thereof, this being generally desirable when the depth of pulp is uniform throughout the cells, as will be the case with the construction shown. If desired, however, there may be more or less variation in the pressure of the air supplied to different cells or to different floor sections in any cell, to compensate for differences in texture of the mats, and in some cases, there may be variations in the depth of pulp, for example, where the overflow lips are for any reason made of variant height in different cells, and in such cases, the air pressure may also be variant in such cells, in accordance with the difference in hydrostatic head which is to be overcome. In general also, it is desirable to provide for greater air pressure in the aerating devices which supply flotation agent along with the air, than in those devices which supply air alone.

What I claim is:

1. A flotation apparatus comprising a vessel adapted to contain ore pulp, means for introducing ore pulp at one end of said vessel and for discharging the same from the other end thereof, a series of partitions extending transversely of said vessel and dividing the same into a series of cells, the floor of said vessel being formed in a series of steps each forming the floor of one of said cells, said partitions terminating upwardly from the edges of said steps to provide openings extending transversely of said vessel to permit said pulp to flow over the edge of one step and downwardly therefrom on to the upper surface of the next step, said steps being provided with porous media through which a gas may be introduced into the pulp in said cells, and overflow lips along the lateral edges of said cells and spaced at uniform heights above said steps.

2. A flotation apparatus comprising a vessel adapted to contain ore pulp, means for introducing ore pulp at one end of said vessel and for discharging the same from the other end thereof, a series of partitions extending transversely of said vessel and dividing the same into a series of cells, the floor of said vessel being formed in a series of steps each forming the floor of one of said cells, said partitions terminating upwardly from the edges of said steps to provide openings extending transversely of said vessel to permit said pulp to flow over the edge of one step and downwardly therefrom on to the upper surface of the next step, said steps being provided with porous media through which a gas may be introduced into the pulp in said cells, overflow lips along the lateral edges of said cells and spaced at uniform heights above said steps, and adjustable means at the bottoms of said partitions for regulating the sizes of the discharge openings above the edges of said steps.

In testimony whereof I have hereunto subscribed my name this 19 day of January, 1918.

DAVID D. MOFFAT.